United States Patent Office 3,424,964
Patented Jan. 28, 1969

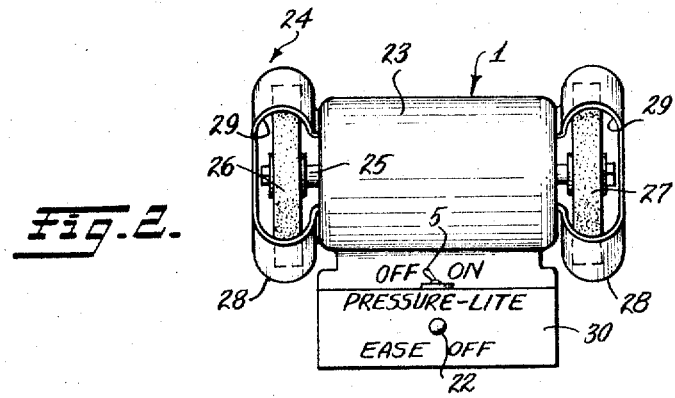
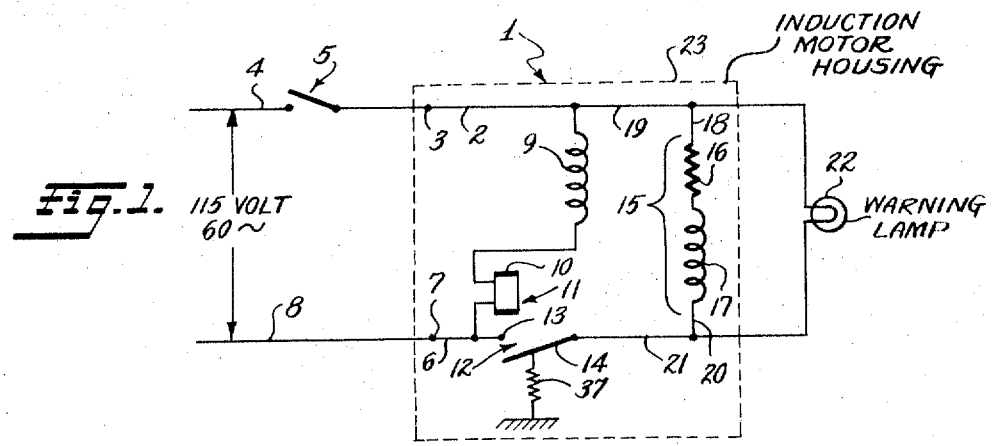
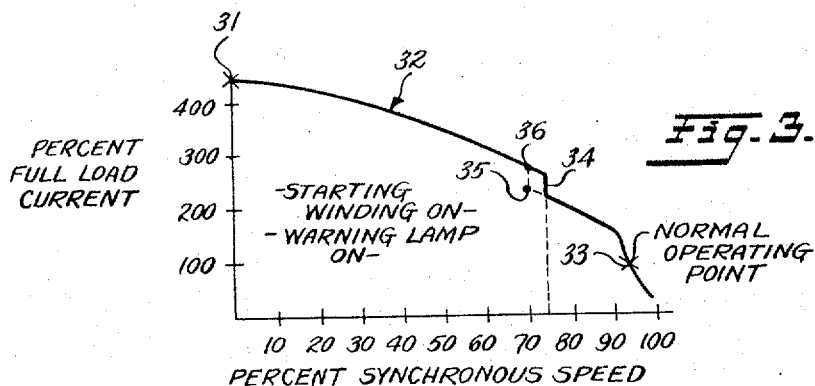

3,424,964
OVERLOAD WARNING SIGNAL FOR MOTORS
Robert N. Bacon, Baltimore County, Md., assignor to The Black and Decker Manufacturing Company, Towson, Md., a corporation of Maryland
Filed Oct. 22, 1965, Ser. No. 500,542
U.S. Cl. 318—220          3 Claims
Int. Cl. H02p 7/36

ABSTRACT OF THE DISCLOSURE

An overload warning signal arrangement for a motor of the type having a main winding and a starting circuit including a starting winding and a starting switch of the type which energizes the starting winding whenever the motor is overloaded. Conventionally, the switch may be of the type which closes in response to excess current in the main winding or under-speed operation of the motor. The warning signal is connected to the motor in such a manner that an overload signal is present whenever the starting winding is energized. In the preferred embodiment, the signal device is a lamp connected across the starting winding of the motor.

---

This invention relates generally to an overload warning device for electric motors and particularly to an overload warning device for motors subjected to manually applied loads.

The invention has particular utility in the environment of an induction motor, with an automatically energized starting winding, used to drive a machine subjected to varying manually applied loads, such as a grinder or buffer.

Because of its low cost and simplicity of construction, the single-phase induction motor is very popular. Its usefulness, however, is limited by its low starting torque, poor efficiency and poor load-speed characteristics. Hence, the uses of this motor are usually restricted to fractional horsepower loads requiring low starting torque and relatively constant running torque, such as fans and vacuum cleaners.

Induction motors require a starting device to assure proper direction of rotation and reasonably good acceleration to running speed. The most common starting arrangement is exhibited by the split-phase motor which has a starting winding in addition to the main or running winding. The usual arrangement includes a current responsive or centrifugal switch which automatically disconnects the starting winding above about 70% of normal running speed of the motor. However, excessive overload of starting winding equipped induction motors frequently results in burnouts of the starting winding. This occurs because the overload may reduce the speed of the motor below the closing value of the centrifugal switch (or increase the motor current due to decrease in back E.M.F., to the pull-in value of a current sensitive switch, where such a switch is used- thus energizing the starting winding. The added torque of the starting winding speeds the motor slightly giving a "seesaw" action with the switch operating on and off and with resultant damage to the starting winding.

One solution to the problem of starting winding burnout is a thermal cutout which disconnects the motor from its power supply in the event of overload. However, where the motor drives a power tool the cutout is annoying to the operator because the motor must stop before the cutout can be reset. In addition, a thermal cutout is expensive, usually costing perhaps 10–15% of the cost of the induction motor with which it is used.

With the warning signal arrangement of this invention accidental burnout of starting windings as well as other damage to induction motors is prevented by warning the operator of the power tool or other device driven by the motor that the motor is overloaded. When warned of the overload, the operator reduces the load on the motor until the warning device goes off, indicating to the operator that the motor is no longer overloaded. In its preferred embodiment the warning device takes the form of a lamp connected in parallel with the starting winding of the motor so the lamp lights whenever the starting winding is energized. The lamp type warning device has particular utility for grinders and other noisy tools since an acoustic signal may not be heard over the noise of the power tool. With the warning device on a bench type grinder, the user of the grinder is instructed that during starting the grinder is not to be used until the warning lamp goes off. In addition, the user of the grinder is instructed that the motor is overloaded whenever the lamp is on. Hence, it is merely necessary for the user to stop grinding or at least decrease pressure against the grinding wheel until the lamp goes off. By warning the user of the grinder of the potentially dangerous condition the likelihood of damage to the motor is substantially avoided.

In the preferred embodiment the starting winding is energized by a relay in response to the current drawn by the starting winding. The relay has stationary and moveable contacts with the moveable contacts biased to a normally open position by a return spring. The contacts and return spring are so arranged that vibration of the motor above a predetermined amplitude causes the moveable contacts to vibrate sufficiently to intermittently engage the fixed contacts. The warning lamp then flickers off and on to warn about the excessive vibration. This vibration sensitive relay arrangement has particular utility where grinding wheels are mounted on the shaft of the motor since improper mounting of the wheels or uneven wear of a wheel could cause excessive vibration which may damage the bearings of the motor. Therefore, the relay is so selected that its contacts will close intermittently when motor vibration is above a predetermined amplitude, thus causing the warning lamp to flicker and warn the user of the grinder about the excessive vibration.

Because of its simplicity, ruggedness, and low cost, the warning device of this invention permits the field of use of induction motors to be vastly extended, at only very slight additional cost, to include almost any use of the motor to drive tools and other devices subjected to manually applied loads without danger of damaging the starting winding of the motor.

Other advantageous features of this invention will become apparent with references to the drawing which forms a part of this specification, and in which:

FIGURE 1 is a schematic drawing of an induction motor having a starting winding and including the warning signal device of this invention;

FIGURE 2 is a front elevational view of a grinder equipped with the warning signal device of this invention; and FIGURE 3 is a graph of Percent Full Load Current vs. Percent Synchronous Speed for an induction motor with starting winding and which shows the speed range of motor for which the starting winding is energized.

Referring now to the drawings in detail and particularly to FIGURES 1 and 2, there is shown an induction motor 1 with the warning signal device incorporated therewith. Motor 1 includes a lead 2 connected at one end to a terminal 3 which in turn is connected to one wire 4 of a power supply line via a SPST on-off switch 5. A second lead 6 has one end connected to a terminal 7 which is connected to a second wire 8 of the power supply line.

3

A main or running winding 9 of motor 1 is connected in series circuit relating with a relay operating winding 10 of a relay 11 having a normally open SPST switch 12 with a stationary contact 13 and a movable contact 14. The main winding side of the series circuit of main winding 9 and relay winding 10 is connected to terminal 3 via lead 2 and the other side is connected to terminal 7 via lead 6.

A starting winding circuit 15 includes a protective impedance 16, connected in series with a starting winding 17.

End 18 of impedance 16 is connected to terminal 3 by lead 2 and wire 19. End 20 of starting winding 17 is connected to movable contact 14 of switch 12 by wire 21. Stationary contact 13 of switch 12 is connected to terminal 7 via lead 6. As is apparent from FIGURE 1, impedance 16, starting winding 17 and switch 12 form a series circuit which is connected in parallel with the series circuit of main winding 9 and relay winding 10.

A warning signal device in the form of a warning lamp 22 is connected across the series circuit of impedance 16 and starting winding 17. Warning lamp 22 is a 115 volt bulb of low power consumption, for example, 7½ watts to maintain the current carrying requirements of the contacts of switch 12 at a minimum value.

As will be observed with reference to FIGURE 1 all the previously referred to components except warning lamp 22 and on-off switch 5 are mounted in housing 23 of motor 1, as shown in dotted line in FIGURE 1.

FIGURE 2 shows a bench type grinder 24 utilizing motor 1 in its housing 23. When used in grinder 24 all the components of motor 1 are contained within motor housing 23. Motor 1 has a driving shaft 25 which extends from each end of housing 23. Grinding wheels 26 and 27 are mounted respectively on each end of shaft 25 so they are directly driven by the motor. Wheel guards 28 may also be connected to housing 24 and partially encircle each of grinding wheels 26, 27, but leave exposed a portion of each wheel for grinding at openings 29 of the guards.

Housing 23 is supported by a base 30 formed integral with the housing. On-off switch 5 is mounted on a horizontal portion of base 30 for convenient use, and may take the form of base 30 and generally centrally thereof in full view of a user of the grinder 24.

The operation of warning lamp 22 and induction motor 1 can best be understood with reference to FIGURES 2 and 3. However, it should first be emphasized that relay winding 10 includes only a few turns of heavy wire to maintain the resistance, and hence, potential drop and heating (IR loss) across this winding at a minimum value.

FIGURE 3 shows that at zero speed the current drawn by motor 1 is at its maximum value of approximately 400% to 500% of its full load value at normal speed. Thus, at the instant on-off switch 5 is closed main winding 9 draws a high starting current as designated at point 31 of curve 32 (FIGURE 3). The high current causes the relay winding 10 to close switch 12 immediately thereby connecting starting winding circuit 15 to the power supply line to energize the starting winding circuit. Starting winding 17 of circuit 15 causes the rotor of motor 1 to accelerate rapidly to operating speed which is shown at point 33 to be slightly above 90% of the synchronous speed of the motor. As the speed of the rotor increases a voltage, commonly referred to as "back E.M.F." is induced in main winding 9.

This "back E.M.F." has a polarity opposite to that of the line current and has the same effect as increasing the impedance of main winding 9. As the speed of the rotor increases, the "back E.M.F." increases and the current drawn by main winding 9 decreases because the "bucking" effect of the back E.M.F. reduces the line potential appearing across main winding 9.

As the current in the main winding decreases the current in relay winding 10 correspondingly decreases until the current goes below the drop-out value of the relay whereupon switch 12 opens to disconnect the starting winding circuit 15. As shown at point 34 of curve 32 this occurs when the motor speed is at about 70% of synchronous speed, and total current to the motor decreases slightly because of the decreased load when the starting winding circuit is disconnected. Main winding 9 then accelerates the motor from point 34 to point 33 of curve 32. It is to be noted with particularity that since warning lamp 22 is connected across starting winding circuit 15, lamp 22 lights whenever switch 12 is closed and the starting winding circuit 15 is energized. Hence, after motor 1 is turned on by closing switch 5, the warning lamp 22 goes on and remains on until the motor speed is above about 70% of synchronous speed whereupon both the starting winding circuit 15 and warning lamp are disconnected. By instructing the user of grinder 24 not to use the grinder until after the warning lamp goes off damage to the motor during starting is avoided. In this regard it should be noted that acceleration from point 34 to point 33 of curve 32 occurs very rapidly because of the action of main winding 9.

With warning lamp 22 off, the used of grinder 24 knows he can use the grinder without damaging the motor. Now assume that the user grinds a heavy piece of metal. Before the metal is pressed against grinding wheel 27 by the user, motor 1 runs at normal speed as at point 33 of curve 32. As the metal is forced against grinding wheel 27 with increasing pressure the speed of motor 1 decreases with corresponding increase of the current in the circuit of main winding 9. Because the pull-in current of a relay is always greater than the drop-out current, relay winding 10 will not close switch 14 until the current in the series circuit of main winding 9 and relay winding 10 is slightly above the drop-out current of the relay. The point at which the relay pulls-in to close switch 12 is at about 70% of synchronous speed as shown at 35 on curve 32.

As soon as switch 12 closes the total current to motor 1 increases to point 36 of curve 32 because of the added load of starting winding circuit 15. Immediately, motor 1 accelerates because of the added torque produced by starting winding 17. The motor then speeds up to point 34 of curve 32 where relay 11 drops out to open switch 12. If the pressure of the metal against the grinding wheel is maintained the motor "seesaws" with corresponding rapid acceleration and deceleration, and repeated energization and de-energization of starting winding circuit 15. If pressure of the metal against the grinding wheel is increased the "seesaw" action does not occur but the motor then operates at a point to the left of point 36 on curve 32 where the high current drawn by main winding 9 could damage this winding. In either instance, the starting winding 17 may be damaged because it is not normally designed to operate continuously, or to cycle rapidly.

However, as soon as switch 12 closes to energize starting winding circuit 15 warning lamp 22 goes on and the user of grinder 24 is immediately warned that the motor is overloaded and that he must reduce the pressure of the metal against the grinding wheel to avoid damage to motor 1. In addition, after the user becomes familiar with the load limitations of the grinder, by continued use, he will rarely load the grinder sufficiently to cause the warning lamp to go on. Hence, the warning lamp arrangement is of particular utility to the home hobbyist who will respect the load limitations of the motor and obtain many years of service from a relatively inexpensive grinder or other tool.

Contacts 13 and 14 and return spring 37 of switch 12 of relay 11 are so selected and arranged that the contacts close in response to vibration above a predetermined amplitude. Such vibration could be caused by an unstable pedestal or other mounting means, or by uneven wear of one of the grinding wheels which could easily cause damage to the bearings of the motor or injury to the user of the grinder. However, when switch 12 closes intermittently warning lamp 22 flickers and the user is again warned of the dangerous condition.

In view of the foregoing it is apparent that by providing the warning lamp arrangement of this invention at only a few cents additional manufacturing cost, the applications of induction motors so equipped is vastly extended. In addition, a smaller less expensive motor equipped with a warning lamp can be used to drive the same load as a larger motor because there is little if any chance for continued overload of the warning lamp equipped motor.

Although a preferred embodiment of this invention has been shown and described in the environment of a grinder driven by an induction motor, it is to be understood that numerous changes and ramification may be made without departing from the scope of this invention. For example, a speed responsive centrifugal switch could be used in place of the described relay, and the warning signal could be audible rather than visible, as described.

What is claimed is:

1. In a tool or machine driven by an electric motor having a main winding and a starting circuit including a starting winding and switch means to energize the starting winding whenever the motor is overloaded, and means connecting the motor to a power source, and wherein the tool or machine is of the type in which its degree of loading is controlled by the relative pressure between a work piece and the tool or machine, the pressure being manually applied by an operator manipulating one of said workpiece and tool or machine, the improvement comprising:
    means to warn the operator of an overload condition of the motor resulting from said pressure, without disconnecting the motor from its power source, whereby the motor continues to run and drives the tool or machine when the signal is present, said means comprising:
        a signal lamp on said tool or machine at a location viewable by the operator, and
        means connecting said signal lamp in said starting circuit so it is illuminated to warn the operator of the overload condition whenever the starting winding is energized,
    whereby the operator is warned to reduce said pressure of the tool or machine relative to the workpiece until the signal ceases.

2. The improvement according to claim 1 wherein:
    said tool or machine is stationary,
    said workpiece is moved relative to the tool or machine, and
    said signal lamp is connected across at least a portion of the starting winding of the motor.

3. In an electric motor having a housing, a main winding, a starting circuit including a starting winding and switch means, connecting means connecting the windings to a power source, said switch means being operable to a conducting condition in which the starting winding is energized in response to an overload condition of said motor and to a nonconductive condition in which the starting winding is unenergized when the overload condition does not exist, and wherein the motor drives a tool or implement the loading of which is controlled by an operator, the improvement comprising:
    means to warn the operator about the overload condition of the motor without disconnecting the motor from said power source, said means comprising:
        a lamp bulb connected across the starting winding of said motor and operable to an overload warning condition whenever the starting winding is energized, to warn its operator about the overload condition of the motor;
        said lamp bulb being mounted on the motor housing to provide a visual indication of the overload to the operator;
    whereby the operator of the tool or implement is warned to reduce the load on the motor until the warning signal ceases, and damage to the starting winding is thereby avoided.

References Cited
UNITED STATES PATENTS

| | | | |
|---|---|---|---|
| 2,552,088 | 5/1951 | Davis | 340—270 |
| 3,071,719 | 1/1963 | Latter | 318—221 XR |
| 3,292,067 | 12/1966 | Clark | 318—221 |
| 3,327,193 | 6/1967 | Mungard | 318—221 |

ORIS L. RADER, *Primary Examiner.*

GENE RUBINSON, *Assistant Examiner.*

U.S. Cl. X.R.

318—221